United States Patent
Beeken

(10) Patent No.: US 8,868,860 B2
(45) Date of Patent: Oct. 21, 2014

(54) RESTORE IN CASCADED COPY ENVIRONMENT

(75) Inventor: Christopher B. Beeken, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 13/244,094

(22) Filed: Sep. 23, 2011

(65) Prior Publication Data

US 2013/0080695 A1    Mar. 28, 2013

(51) Int. Cl.
*G06F 12/00* (2006.01)
*G06F 3/06* (2006.01)
*G06F 11/14* (2006.01)

(52) U.S. Cl.
CPC ............ *G06F 3/065* (2013.01); *G06F 11/1469* (2013.01); *G06F 11/1448* (2013.01)
USPC .................... 711/162; 711/112; 711/E12.103

(58) Field of Classification Search
None
See application file for complete search history.

(56) References Cited

U.S. PATENT DOCUMENTS

| | | | |
|---|---|---|---|
| 7,007,143 B2 | 2/2006 | Cochran | |
| 7,188,272 B2 | 3/2007 | Bartfai et al. | |
| 7,191,304 B1 | 3/2007 | Cameron et al. | |
| 7,360,048 B2 | 4/2008 | Agombar et al. | |
| 7,386,695 B2 | 6/2008 | Fuente | |
| 7,509,523 B2 | 3/2009 | Agombar et al. | |
| 7,676,641 B2 | 3/2010 | Agombar et al. | |
| 7,752,457 B2 | 7/2010 | Yagawa | |
| 7,793,144 B2 | 9/2010 | Agombar et al. | |
| 8,051,259 B2 | 11/2011 | Agombar et al. | |
| 8,230,185 B2 | 7/2012 | Agombar et al. | |
| 2004/0030727 A1 | 2/2004 | Armangau et al. | |
| 2005/0021565 A1 | 1/2005 | Kapoor et al. | |
| 2005/0278391 A1 | 12/2005 | Spear et al. | |
| 2006/0112244 A1 | 5/2006 | Buah et al. | |
| 2006/0139697 A1 | 6/2006 | Fuente | |
| 2006/0143413 A1 | 6/2006 | Agombar et al. | |
| 2006/0179061 A1 | 8/2006 | D'Souza et al. | |

(Continued)

FOREIGN PATENT DOCUMENTS

| | | |
|---|---|---|
| CN | 1702627 | 11/2005 |
| CN | 1794199 | 6/2006 |

(Continued)

OTHER PUBLICATIONS

Xiao et al., "A Case for Continuous Data Protection at Block Level in Disk Array Storages", IEEE Computer Society, Jun. 2009, vol. 20, 14 pgs.

(Continued)

*Primary Examiner* — Christian P Chace
*Assistant Examiner* — Brendan Lillis
(74) *Attorney, Agent, or Firm* — William Konrad; Konrad, Raynes, Davda and Victor LLP

(57) ABSTRACT

In one aspect of the present description, handling multiple backup processes comprises detecting that a defined storage volume is present in a first cascade of storage volumes; detecting that the defined storage volume is present in a second cascade of storage volumes; receiving a data write for a last storage volume in the first cascade of storage volumes; and performing a cleaning data write on the defined storage volume in the second cascade of storage volumes, wherein the cleaning data write corresponds to the received data write. Other aspects may be utilized, depending upon the particular application.

14 Claims, 9 Drawing Sheets

(56) References Cited

U.S. PATENT DOCUMENTS

| | | | |
|---|---|---|---|
| 2006/0230243 A1 | 10/2006 | Cochran et al. | |
| 2007/0016740 A1 | 1/2007 | Somavarapu | |
| 2007/0061531 A1 | 3/2007 | Bartfai et al. | |
| 2007/0294493 A1 | 12/2007 | Buah et al. | |
| 2008/0114951 A1 | 5/2008 | Lee | |
| 2008/0183973 A1 | 7/2008 | Aguilera et al. | |
| 2008/0189482 A1 | 8/2008 | Fuente | |
| 2008/0215837 A1 | 9/2008 | Agombar et al. | |
| 2008/0256311 A1 | 10/2008 | Lee | |
| 2009/0307450 A1 | 12/2009 | Lee | |
| 2010/0023561 A1 | 1/2010 | Zlotnick | |
| 2010/0077160 A1 | 3/2010 | Liu et al. | |
| 2010/0088468 A1* | 4/2010 | Agombar et al. | 711/112 |
| 2011/0208932 A1* | 8/2011 | Agombar et al. | 711/162 |
| 2011/0225380 A1* | 9/2011 | Agombar et al. | 711/162 |
| 2011/0296127 A1 | 12/2011 | Agombar et al. | |
| 2012/0226879 A1 | 9/2012 | Agombar et al. | |
| 2012/0246427 A1 | 9/2012 | Agombar et al. | |

FOREIGN PATENT DOCUMENTS

| | | |
|---|---|---|
| CN | 1828513 | 9/2006 |
| EP | 1645960 | 2/2007 |
| WO | 2010049314 | 5/2010 |
| WO | 2011036015 | 3/2011 |
| WO | 2011036020 | 3/2011 |

OTHER PUBLICATIONS

Hou et al., "Data Replication and Recovery with Dell/EMC SnapView 2.0 and MirrorView", Dell Enterprise Systems, Feb. 2003, 23 pgs.

U.S. Appl. No. 13/847,978, filed Mar. 20, 2013, entitled, "Restore in Cascaded Copy Environment" invented by Christopher B. Beekan, pp. 1-50.

Preliminary Remarks for U.S. Appl. No. 13/847,978, filed Mar. 20, 2013, entitled, "Restore in Cascaded Copy Environment" invented by Christopher B. Beekan, pp. 1-2.

U.S. Appl. No. 13/039,108 (18.386), filed Mar. 2, 2011 by inventors J.P. Agombar, et al., pp. 1-22.

Office Action dated Nov. 16, 2012, pp. 1-21, for U.S. Appl. No. 13/039,108 (18.386), filed Mar. 2, 2011 by inventors J.P. Agombar, et al., pp. 1-21.

Response dated Feb. 12, 2012, pp. 1-10, for U.S. Appl. No. 13/039,108 (18.386), filed Mar. 2, 2011 by inventors J.P. Agombar, et al., pp. 1-10.

Notice of Allowance, dated May 8, 2013 for U.S. Appl. No. 13/039,108 (18.386), filed Mar. 2, 2011 by inventors J.P. Agombar, et al., pp. 1-21.

U.S. Appl. No. 13/125,276 (18.389), filed Apr. 30, 2011 by inventors J.P. Agombar, et al., pp. 1-11.

Preliminary Amendment dated Apr. 20, 2011, for U.S. Appl. No. 13/125,276 (18.389), filed Apr. 30, 2011 by inventors J.P. Agombar, et al., pp. 1-9.

Preliminary Amendment dated May 17, 2012, for U.S. Appl. No. 13/125,276 (18.389), filed May 17, 2012 by inventors J.P. Agombar, et al., pp. 1-6.

Office Action, dated Apr. 15, 2013,for U.S. Appl. No. 13/125,276 (18.389), filed May 17, 2012 by inventors J.P. Agombar, et al., pp. 1-64.

Response to Office Action, dated Jul. 15, 2013, for U.S. Appl. No. 13/125,276 (18.389), filed May 17, 2012 by inventors J.P. Agombar, et al., pp. 1-12.

Notice of Allowance, dated Nov. 8, 2013, for U.S. Appl. No. 13/125,276 (18.389), filed May 17, 2012 by inventors J.P. Agombar, et al., pp. 1-13.

U.S. Appl. No. 13/474,647 (18.389C1), filed May 17, 2012 by inventors J.P. Agombar, et al., pp. 1-18.

Office Action, dated May 19, 2013, for U.S. Appl. No. 13/474,647(18.389C1), filed May 17, 2012 by inventors J.P. Agombar, et al., pp. 1-39.

Response to Office Action, dated 20132-05-09, for U.S. Appl. No. 13/474,647(18.389C1), filed May 17, 2012 by inventors J.P. Agombar, et al., pp. 1-13.

Notice of Allowance, dated Dec. 6, 2013, for U.S. Appl. No. 13/474,647 (18.389C1), filed May 17, 2012 by inventors J.P. Agombar, et al. pp. 1-11.

US Patent Application, dated 201-03-22, for U.S. Appl. No. 13/069,293 (18.397), filed Mar. 22, 2011 by inventors J.P. Agombar, et al., pp. 1-24.

Preliminary Amendment, dated May 29, 2012 for U.S. Appl. No. 13/069,293 (18.397), filed Mar. 22, 2011 by inventors J.P. Agombar, et al., pp. 1-8.

Office Action dated Jan. 7, 2013, for U.S. Appl. No. 13/069,293 (18.397), filed Mar. 22, 2011 by inventors J.P. Agombar, et al., pp. 1-42.

Response dated Apr. 8, 2013 for U.S. Appl. No. 13/069,293 (18.397), filed Mar. 22, 2011 by inventors J.P. Agombar, et al., pp. 1-11.

Preliminary Remarks dated May 29, 2012, for U.S. Appl. No. 13/482,656 (18.397C1), filed May 29, 2012 by inventors J.P. Agombar, et al., pp. 1-6.

Office Action dated Mar. 28, 2013, for U.S. Appl. No. 13/482,656 (18.397C1), filed May 29, 2012 by inventors J.P. Agombar, et al., pp. 1-30.

Response to Office Action, dated Jun. 28, 2013, for U.S. Appl. No. 13/482,656 (18.397C1), filed May 29, 2012 by inventors J.P. Agombar, et al., pp. 1-10.

Final Office Action, dated Sep. 24, 2013, for U.S. Appl. No. 13/482,656 (18.397C1), filed May 29, 2012 by inventors J.P. Agombar, et al., pp. 1-41.

Office Action, dated Sep. 25, 2013, for U.S. Appl. No. 13/847,978 (37.266C1), filed Mar. 20, 2013 by Christopher B. Beekn et al., pp. 1-19.

US Patent Application, dated Mar. 20, 2011, for U.S. Appl. No. 13/039,245 (18.385), filed Mar. 20, 2011 by inventors J.P. Agombar, et al., pp. 1-22.

U.S. Appl. No. 13/251,867 (37.268), filed Oct. 3, 2011 by inventors C.B. Beeken, et al., pp. 1-32.

National Stage U.S. Appl. No. 13/497,788 (37.283), filed Mar. 22, 2012 by inventors C.F. Fuente, et al., pp. 1-23.

37.284 RD National Stage U.S. Appl. No. 13/497,791, filed Mar. 22, 2012 by inventors C.F. Fuente, et al., pp. 1-11.

PCT International Search Report dated Sep. 14, 2011 for Application No. PCT/EP2011/057950 filed May 17, 2011.

English abstract of Chinese patent No. CN1794199, published Jun. 28, 2006 by S. Agombar et al.

"Information Materials for IDS" dated Oct. 5, 2011 from Japanese Office Action dated Sep. 20, 2011 for Application No. 2011-533674 filed Oct. 20, 2009, pp. 1-2.

Chinese Office Action dated Nov. 29, 2012 for Serial No. 200980140528.6.

"Information Materials for IDS" dated Dec. 6, 2012 for Chinese Office Action dated Nov. 29, 2012.

English translation of CN1702627 Nov. 30, 2005.

English Translation of CN1828513 Sep. 6, 2006.

Prelim Remarks dated May 17, 2012, pp. 1-2 for U.S. Appl. No. 13/474,647, filed May 17, 2012 by inventors J.P. Agombar, et al., (18.38901).

Final Office Action, dated May 24, 2013, for U.S. Appl. No. 13/069,293 (18.397), filed Mar. 22, 2011 by inventors J.P. Agombar, et al., pp. 1-40.

US Patent Application, dated May 29, 2012, for U.S. Appl. No. 13/482,656 (18.397C1) , filed May 29, 2012 by inventors J.P. Agombar, et al., pp. 1-24.

Preliminary Remarks, dated Mar. 20, 2013, for U.S. Appl. No. 13/847,978 (37.266C1), filed Mar. 20, 2013 by Christopher B. Beekn et al., pp. 1-2.

(56) References Cited

OTHER PUBLICATIONS

Response to Office Action, dated Dec. 26, 2013, for U.S. Appl. No. 13/847,978 (37.266C1), filed Mar. 20, 2013 by Christopher B. Beekn et al., pp. 1-10.
Final Office Action, dated Feb. 26, 2014, for U.S. Appl. No. 13/847,978 (37.266C1), filed Mar. 20, 2013, entitled "Restore in Cascaded Copy Environment", invented by Christopher B. Beeken et al., pp. 1-20.
Response to Final Office Action, dated May 7, 2014, for U.S. Appl. No. 13/847,978 (37.266C1), filed Mar. 20, 2013, entitled "Restore in Cascaded Copy Environment", invented by Christopher B. Beeken et al., pp. 1-5.
Notice of Allowance, dated May 28, 2014, for U.S. Appl. No. 13/847,978 (37.266C1), filed Mar. 20, 2013, entitled "Restore in Cascaded Copy Environment", invented by Christopher B. Beeken et al., pp. 1-9.

* cited by examiner

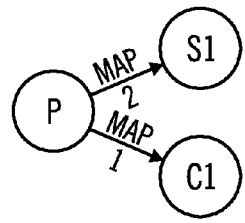 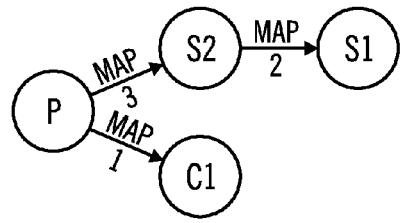
FIG. 3A  FIG. 3B
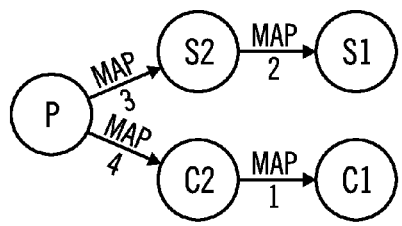 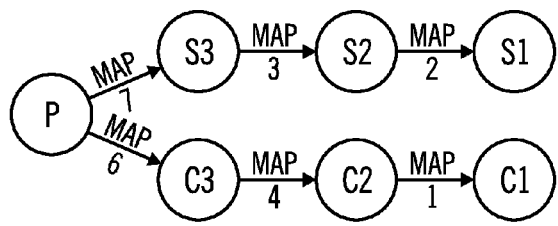
FIG. 3C  FIG. 3D
 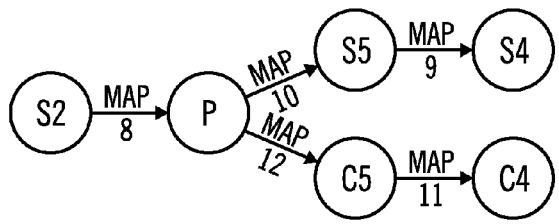
FIG. 4  FIG. 5

RESTORE IN CASCADED COPY ENVIRONMENT

BACKGROUND

This invention relates to a method of, and system for, facilitating backup processes.

Storage area network (SAN) is an architecture that is often used when very large amounts of data are to be stored in a reliable and secure manner. This technology allows networks to be created that support the attachment of remote computer storage devices such as disk arrays to servers in such a way that, to the operating system, the devices appear as locally attached. It is common in these networks to include a large amount of redundancy, both in the data storage and in the hardware connections between the individual components.

Various methods exist for creating data redundancy. For example, a function such as a FlashCopy® function enables an administrator to make point-in-time, full volume copies of data, with the copies immediately available for read or write access. (FlashCopy is a registered trademark of International Business Machines Corporation in the United States and other countries.) The FlashCopy® can be used with standard backup tools that are available in the environment to create backup copies on tape. A FlashCopy® function creates a copy of a source volume on a target volume. This copy, as mentioned above, is called a point-in-time (PIT) copy. When a FlashCopy® operation is initiated, a relationship is created between a source volume and target volume. This relationship is a "mapping" of the source volume and the target volume. This mapping allows a point-in-time copy of that source volume to be copied to the associated target volume. The relationship exists between this volume pair from the time that the FlashCopy® operation is initiated until the storage unit copies all data from the source volume to the target volume, or the relationship is deleted.

FlashCopy is often used for creating recovery points that are application consistent point in time copies of the production data. These recovery points can then be used in the event of production data corruption. Because the production system is often of limited usefulness when data corruption occurs, the user frequently needs to be able to restore the production data immediately. Additionally users typically do not want to sacrifice any existing backups because restoring the production system may need to be re-triggered if mistakes are made when recovering the system.

When the data is physically copied, a background process copies tracks from the source volume to the target volume. The amount of time that it takes to complete the background copy depends on various criteria, such as the amount of data being copied, the number of background copy processes that are running and any other activities that are presently occurring. The FlashCopy® function works in that the data which is being copied does not actually need to be copied instantaneously, it only needs to be copied just prior to an update causing on overwrite of any old data on the source volume. So, as data changes on the source volume, the original data is copied to the target volume before being overwritten on the source volume. This copying operation is often referred to as a "copy write" and is part of a "cleaning" in which dependency of the target volume on the source volume is removed for the grain of data copied.

Therefore, a FlashCopy® is a feature supported on various storage devices that allows a user or an automated process to make nearly instantaneous copies of entire logical volumes of data. A copy of a source disk is made on a target disk. The copies are immediately available for both read and write access. A common feature of FlashCopy® like implementations is the ability to reverse the copy. That is, to populate the source disk of a FlashCopy® map with the contents of the target disk, typically in a restore operation.

There are two types of point-in-time (PIT) backup processes commonly used in data storage systems. One is called a clone and the other a snapshot. A clone is a PIT copy where the target disk will hold a complete copy of the data that was on the source disk when the PIT copy was started. When the copying of data from source to target completes, the target disk is independent of the source.

Conversely, a snapshot is a PIT copy where the target only holds the changed data necessary to present the PIT copy of the source. Data is typically only copied to the target disk if it is changed on the source. The target disk is generally dependent on some of the data on the source disk in order to present the PIT copy.

It is also possible to use FlashCopy® in cascaded implementations, in which a target disk later becomes the source disk for a further FlashCopy® or vice versa. A cascaded configuration of storage volumes is described in detail in U.S. Pat. No. 7,386,695.

A cascade may be used to implement multiple PIT copies of a single data source. For example, with a data source S and PIT copies of S taken at times t1, t2 and t3, then at time t1 there is taken a PIT copy using data target T1 resulting in a cascade: S→T1. Then at time t2 there is taken a second PIT copy using data target T2 and resulting in the cascade: S→T2→T1. This arrangement works because if data stored on T1 or S changes between times t1 and t2 the original data can still be found on T1. Alternatively, if the data has not been changed between times t1 and t2, then both T1 and T2 will contain or point to the same data. Adding a third backup at t3 produces the cascade: S→T3→T2→T1.

This technique has many benefits. However, it also introduces dependencies between the data targets that may not exist in a traditional multiple target implementation. A side effect of this target dependency can be a requirement to "clean" a target when a PIT copy is stopped or completes. For example, if PIT copy S→T2 is stopped, any data on T2 that is required by T1 is typically copied from T2 to T1 before the target T2 can be removed from the cascade. In many situations this is not a problem, because the user may wish T1 to hold a complete copy of S at time t1, meaning that the backup process S→T1 is a clone. However, if the intention of S→T1 is just to produce a snapshot of S at time t1, this extra copying from T2 to T1 may cause the user problems. Further, if the data target T1 was thinly provisioned (also known as space efficient), the problems caused by the above behavior may cause the unnecessary allocation of storage to T1. In some applications this may reduce the user's ability to maintain snapshots and clones and to manage their backups.

There are a number of existing techniques that attempt to reduce the amount of data that is copied in a cleaning from one volume to another, such as from T2 to T1, with varying degrees of success. However, many such solutions can dramatically increase the amount of metadata used to track the contents of the various data targets.

It is also possible to create multiple cascades of storage volumes which are interlocking at a logical level. For example, a first cascade may comprise storage volumes A, B, C and D which are arranged in a cascade as follows: A↔B↔C↔D, while at a later time a new backup of A may be started that ultimately leads to the creation of A↔E↔F. Many different combinations of FlashCopy® functions and reversed functions are possible, potentially creating complicated multiple cascading storage volumes.

In a traditional multiple target FlashCopy implementation the restoration process can be relatively straight forward. However such systems are frequently not scalable in terms of copy writes required for any host write. A cascaded multiple target implementation is usually scalable because the number of copy writes can be bounded wherein the bound may be independent of the number of FlashCopy's of the source volume. Thus, a cascaded approach is frequently desirable in situations when many recovery points are desired or anticipated. However, a cascaded approach can complicate restore operations.

For example, in order to keep track of such cascaded storage volumes and FlashCopy® functions it is preferable to provide a data structure that defines primary and secondary "fdisks". An fdisk is a logical component that includes an index defining the storage volume to which the fdisk relates and providing links to the relevant maps that define the up and down directions of the FlashCopy® functions in a cascade. When a FlashCopy® function is created between a source volume and a target volume, primary fdisks are often created for each storage volume, unless a primary fdisk already exists for the target disk, in which case that existing fdisk for the target volume is converted to a secondary fdisk and a new primary fdisk is created. The advantage of using a data structure as defined by the fdisks is that the fdisks can be used to keep track of the input/output (IO) read and write accesses to different storage volumes within existing multiple cascades and direct data reads to the correct location within the cascade.

The use of the concept of fdisks allows a storage volume to appear in different FlashCopy® cascades concurrently. The more times that a disk appears in a cascade the more read and write IO operations in a cleaning operation (cleaning IOs) may be required at the FlashCopy® level before a host originated IO can be completed back to the host. For this reason the number of fdisks for each disk is typically limited (for example to 2). This can, in turn, limit the number of active FlashCopy® backup or restore operations that can be started in a cascade, whilst any existing maps are still active. One approach for addressing this problem is to collapse cascades containing fdisks from the same disk back into a single cascade. However, there are frequently undesirable limitations associated with operations which will permit reforming a single cascade. Two examples are given below.

In a first example, suppose there are disks A, B, C, D, E and F. There are created FlashCopy® maps A→B, A→C, A→D, A→E and A→F. If the system started the maps A→D, A→C and A→B in order then there will be the cascade A→B→C→D. After A→D completes, there will result a cascade A→B→C. If it is now discovered that disk A is corrupt and the administrator wishes to restore disk A from disk D, then there is created and started a map D→A, which results in cascades D→A and A→B→C. Before FlashCopy® D→A is completed, the administrator often wishes to continue making backups of disk A. Consequently, maps A→F and A→E may be started before D→A is completed. Thus, cascades D→A→E→F and A→B→C may result.

In this scenario, the administrator may be limited to only two fdisks for A (to limit IO cleaning operations) and thus not permitted to add another one for a new restore operation, until either A→B and A→C stop or complete, or D→A stops or D→A and A→E complete. If disk A were to again become corrupted, the administrator may not be permitted to restore disk A again until the above operations stop or complete.

However if there is a restriction imposed such that it is only permitted to write to the original source disk A, then when D→A completes it is possible to naturally return the cascade configuration to A→E→F→B→C, because the cleaning operations associated with writes to A result in B being independent of any grains changed since D→A was started. However, this read-only target restriction may mean that the user is not permitted to create FlashCopy® maps for development or test purposes, since those maps typically involve writing to the targets.

In a second example, suppose there are disks A, B, C, D, E and F, and there is created FlashCopy® maps A→B, B→C, B→D, B→E and B→F. Suppose further that A→B is incremental and disks C, D, E and F are Space Efficient vdisks. The user starts maps A→B and then B→C giving a cascade A→B→C. When A→B completes, a "split stop" occurs which leaves cascade B→C. In other words, disk C is independent of disk A, such that if disk A fails, then disk C is still available to the user. Now if the user starts A→B again, which completes quickly because it is incremental, it is also possible to start B→D. This gives cascades A→B→D and B→C. When A→B completes, the user again "split stops" it resulting in the cascade B→D→C. The split stop in the cascade upon completion of A→B, minimizes the number of fdisks and allows the user to again restart A→B, if needed. However, such operations frequently include the limitations that only disk A and/or disk B are written to by the host. As with the previous example, this means that the user frequently is not permitted to create FlashCopy® maps for development or test purposes, since such maps may require its target to be writable.

BRIEF SUMMARY

According to a first aspect of the present description, there is provided a method of handling multiple backup processes, comprising: detecting that a defined storage volume is present in a first cascade of storage volumes; performing a restore operation to the defined storage volume in a second cascade of storage volumes, from a restoration operation source storage volume in the first cascade of storage volumes; receiving a data write for the oldest storage volume in the second cascade of storage volumes; and performing a cleaning data write from the restoration operation source storage volume in the first cascade of storage volumes to next storage volume in the first cascade of storage volumes, wherein the cleaning data write corresponds to the received data write.

According to a second aspect of the present description, there is provided system for managing multiple backup processes comprising a plurality of storage volumes and a storage volume controller connected to the storage volumes, the storage controller including a processor and a computer readable storage medium having computer readable program code embodied therein executed by the processor to perform managing operations, the managing operations comprising: detecting that a defined storage volume is present in a first cascade of storage volumes; performing a restore operation to the defined storage volume in a second cascade of storage volumes, from a restoration operation source storage volume in the first cascade of storage volumes; receiving a data write for the oldest storage volume in the second cascade of storage volumes; and performing a cleaning data write from the restoration operation source storage volume in the first cascade of storage volumes to next storage volume in the first cascade of storage volumes, wherein the cleaning data write corresponds to the received data write.

According to a third aspect of the present invention, there is provided a computer program product for managing multiple backup processes, the computer program product comprising a computer readable storage medium having computer readable program code embodied therein that executes to perform operations, the operations comprising: detecting that a defined storage volume is present in a first cascade of storage volumes; performing a restore operation to the defined storage volume in a second cascade of storage volumes, from a restoration operation source storage volume in the first cascade of storage volumes; receiving a data write for the oldest storage volume in the second cascade of storage volumes; and performing a cleaning data write from the restoration operation source storage volume in the first cascade of storage volumes to next storage volume in the first cascade of storage volumes, wherein the cleaning data write corresponds to the received data write.

Other features and aspects may be realized, depending upon the particular application.

BRIEF DESCRIPTION OF THE SEVERAL VIEWS OF THE DRAWINGS

Embodiments of the present description will now be described, by way of example only, with reference to the accompanying drawings, in which:

FIGS. 3a-3d are schematic diagrams of separated snapshot and clone FlashCopy® cascades;

FIG. 4 is a schematic diagram of a restore operation from a snapshot backup volume in a FlashCopy® cascade;

FIG. 5 is schematic diagram of a restore operation in separated snapshot and clone FlashCopy® cascades;

DETAILED DESCRIPTION

The illustrated embodiment of the present description is directed to backup management operations which permit a production or other volume to be readily restored from any volume or other recovery point in a cascade or tree of cascades of storage volumes without waiting for ongoing copy operations to stop or complete. As a consequence, a customer or other user can create many recovery points of the production data and restore the production data at any point, while retaining recovery points, that is potential source volumes for restoration operations. Furthermore, although copy write operations may still be bounded by the number of instances of the production volume present in the FlashCopy cascade, frequently there may be no need for more than 2 instances at any time because the restore process can be readily refreshed or changed to a new recovery point with little or no loss of existing recovery points.

As described in greater detail below, in one aspect of the present description, backup management operations in accordance with one embodiment of the present description, include cleaning operations from the source volume of the restoring operation (recovery point). These cleaning operations can permit the restoration to be stopped at any point without waiting for copy operations to complete or stop and without sacrificing some or all existing backups. Instead, backups of the production volume taken after the restore is initiated, can be retained by slipping them into an existing cascade after the source volume of the restore. Furthermore, because the clone and snapshot backups are separated into different cascades, little or no cleaning may be required as a result of the stop of the restore operation.

Figure 1:
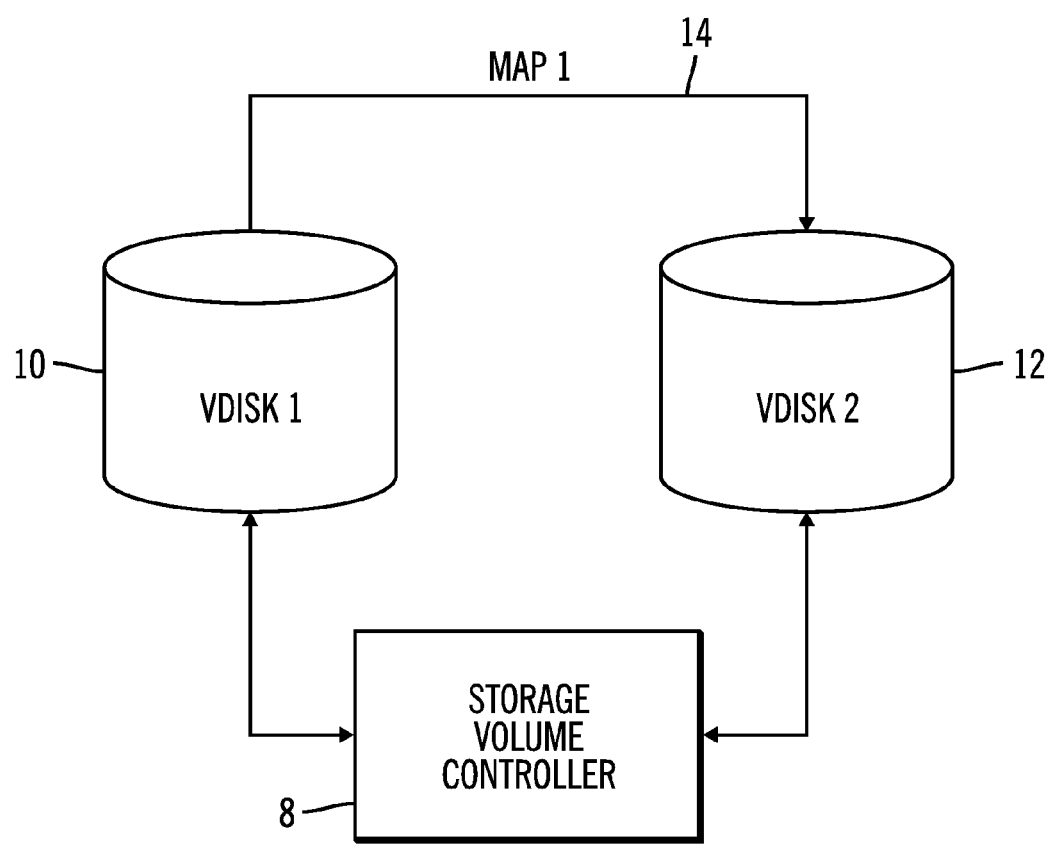
FIG. 1 is a schematic diagram of a pair of storage disks.

FIG. 1 illustrates the concept of a backup process using a storage controller 8 and two storage disks 10 and 12. The disks 10 and 12 could form part of a larger array of disks, and may form part of an enterprise storage solution. The disks 10 and 12 could be part of a storage solution relating to a commercial website, for example. If at any time a backup needs to be made of the content of vdisk1, then a FlashCopy instruction can be sent from the storage volume controller 8 to that disk 10, which defines a source disk 10 (vdisk1) and also a target disk 12 (vdisk2), which is the target of the FlashCopy. The FlashCopy instruction creates a point-in-time copy of the image of the specific vdisk which is the source disk 10.

In the embodiment of FIG. 1, the source disk 10 of a first FlashCopy instruction is vdisk1, and the target disk 12 is vdisk2. The FlashCopy instruction starts the FlashCopy process, which creates a map 14 from the source disk 10 to the target disk 12. This map is labelled MAP 1 in the Figure. The image of vdisk1 at this specific point in time is now available on vdisk2. This creates a backup of the data on vdisk1, and also allows tests and other administration tasks to be run on the data of vdisk1, without the attendant danger of losing any of the original data, as it is preserved on the original source disk.

When a FlashCopy is made, it creates a link between the two disks 10 and 12, as defined by the map 14. Data may now be copied across in the background, with the additional requirement that any access to vdisk2 (as the target disk 12) may immediately cause the relevant parts of the image of vdisk1 to be copied across, and also any access to vdisk1 which would result in a change to the image stored by that disk 10 will also cause the unaltered data to be immediately copied across to the target disk 12, prior to the change being made. In this way, the vdisk2, to an outside user, stores the point in time copy of vdisk1, although data may only be physically copied across under the circumstances described above.

Figure 2:
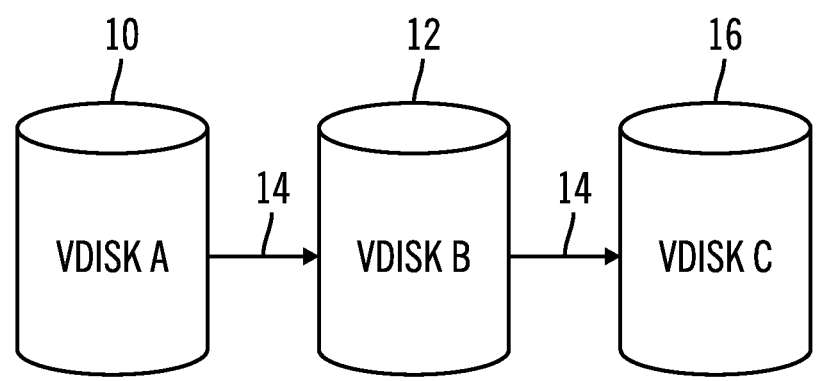
FIG. 2 is a schematic diagram of a FlashCopy® cascade.

A storage volume that is the target volume of a backup process such as a FlashCopy function can also be the source volume of a further backup process, thus creating a cascade of storage volumes. In FIG. 2 there is shown an example of a FlashCopy cascade of three storage volumes 10, 12 and 16, which are linked by FlashCopy maps 14. Each map 14 defines a backup process from a source volume to a target volume. Disk B is providing a backup of disk A, and disk C is also providing a backup of disk A, through disk B. The FlashCopy functions 14 linking the different storage volumes may have been started at different times, which create different pointin-time copies of the images stored by the respective storage volumes, or could have been started simultaneously.

In the FlashCopy cascade of A→B→C, where A, B and C are the disks in the cascade, as shown in FIG. 2, and the arrows are the FlashCopy maps, then denoting (A, B) to be a Flash-Copy mapping from disk A to disk B, the cascade has maps (A, B) and (B, C). In this implementation of the cascade, any new data write to disk A will cause a write, that is a "copy write", to disk B, as per the respective FlashCopy function, which is required to maintain the image on disk B. This writing to disk B will cause a further read, often referred to as a "clean read", of disk B followed by another copy write to disk C. In this way a single write to the first storage volume 10 in the cascade can result in a number of IO cleaning operations throughout the cascade.

When a cascade is created, the new maps and new storage volumes are inserted into the cascade, not added to the end of the cascade. In the cascade shown in FIG. 2, the first backup process started would be A→C. When the backup process A→B is then started, the new target storage volume B is effectively "inserted" between the existing source storage volume A and the existing target storage volume C. This "insertion" is purely a logical construction illustrating the fact that target disk C will receive data writes from disk B, rather than disk A. This is how a cascaded implementation differs from a conventional arrangement which would have two independent maps from disk A.

In accordance with copending application Ser. No. 13/069,293, filed Mar. 22, 2011 and entitled "MULTIPLE CASCADED BACKUP PROCESS" and assigned to the assignee of the present application, the storage volume controller 8 may be operated so that the disks and maps are arranged so that clones and snapshots are separated into different dependency chains or cascades. As described in greater detail below, one feature of separating clones and snapshots into different cascades is to reduce or eliminate cleaning operations caused by termination of a copying operation.

For example, within the context of the present description, suppose Map 1 of FIG. 3a is started as a clone and then some time later Map 2 is started as a snapshot. Then the resulting graph structure for the source volume P, the clone volume C1, and the snapshot volume S1, and used to maintain the target images, would be as shown in FIG. 3a. This structure is a dependency graph.

In the graph shown in FIG. 3a, a data write to disk P may require copy on writes to C1 and/or S1 in order to maintain those images on the target disks of the respective backup processes. If the storage volume controller 8 now starts Map 3, as a snapshot, the resulting dependency graph is as shown in FIG. 3b. In a cascade, the new disk and map to that disk may be placed adjacent to the source disk P, so the new target disk S2 of map 3 is placed in cascade P→S2→S1, where the two maps, map 3 and map 2 are both snapshots. In the separate cascade P→C1 the map 1 is a clone.

Subsequent backup processes as either snapshots or clones of P extend the length of the clone and/or snapshot chains without increasing the number of edges leaving P and so do not increase the number of cleaning operation IOs associated with a write to P. The graph of FIG. 3b can be extended to include further snapshots and clones. To maintain cascade type separation, if a cascade exists for the specific backup process type (clone or snapshot), then the target storage volume is added to the existing cascade for the identified backup process type, or if a cascade does not exist for the identified backup process type, then a new cascade is started, which consists of the target storage volume and the source storage volume. In this way clones and snapshots taken from specific source disks do not appear in the same cascade from that specific source disk.

FIG. 3c illustrates the logical arrangement of the storage volumes after further backup C2 has been taken. If the storage volume controller 8 now starts Map 4, as a clone, the resulting dependency graph is as shown in FIG. 3c. In a cascade, the new disk and map to that disk may be placed adjacent to the source disk P, so the new target disk C2 of map 4 is placed in cascade P→C2→C1, where the two maps, map 4 and map 1, are both clones. In the separate cascade P→S2→S1, the two maps, map 3 and map 2, are both snapshots.

FIG. 3d illustrates the logical arrangement of the storage volumes after further clone and snapshot backups C3 and S3 have been taken. If the storage volume controller 8 now starts map 6 as a clone and map 7 as a snapshot, the resulting dependency graph is as shown in FIG. 3d. In a cascade, the new disk and map to that disk may be placed adjacent to the source disk P, so the new target disk C3 of map 6 is placed in cascade P→C3→C2→C1 (FIG. 3d), where the three maps, map 6, map 4 and map 1, are each clones. The new target disk S3 of map 7 is placed in cascade P→S3→S2→S1 (FIG. 3d), where the three maps map 7, map 3 and map 2 are each snapshots.

Note the order in which the different types are taken can be any permutation of S1, S2, S3, C1, C2, C3 provided the snapshots are in the correct order relative to the other snapshots and the clones are in the correct order relative to other clones. (For example, the start order could be S1, C1, S2, S3, C2, C3). Clearly these cascades can be considered as forming a tree with root node P as shown in FIG. 3d.

As per the respective FlashCopy function with multiple target PIT copies, writes to a disk in a dependency graph would result in a read, split writes and a client write to maintain the other images on the disks. For example, a client (or host) write to P in the above dependency graph may result in 1) a read, that is, a read of P, if the data is required by S3 or C3 for the location being written to is on P, 2) a split write, that is a) a write to S3 of the data read from P, if S3 is dependent on P, and b) a write to C3 of the data read from P, if C3 is dependent on P (which can be performed in parallel to the second action), and 3) a client write, that is, the client write itself to P. As a result of these cleaning operations for each write to P, the volumes S3 and C3 are each independent of any grains changed since those backups were started.

As described in copending application Ser. No. 13/069,293, filed Mar. 22, 2011 and entitled "MULTIPLE CASCADED BACKUP PROCESS" one feature of separating clones and snapshots into different cascades is to facilitate termination of unnecessary backups to reduce or eliminate cleaning associated with the stop itself. For example, if map 4 is stopped in the dependency graph of FIG. 3d, then the storage volume controller 8 will "clean" the data from C3 to C1. This may not be considered to be an added cleaning operation because C1 is also a clone and the data is intended to be copied onto it. The snapshots S3, S2, S1 are not affected.

Conversely, when a snapshot is stopped all snapshots and clones of the target snapshot disk may be readily stopped due to the separation from the clone cascades without additional cleaning resulting from the stop. Furthermore, when a clone is stopped all snapshots of the target clone disk may also be stopped. This approach may be taken because a snapshot is typically dependent on its source. Consequently, if the clone source of a snapshot is destroyed, the dependent snapshot is likely of little or no use. In this manner, by separating clones and snapshots into different cascades, additional cleaning operations can be reduced or eliminated.

If it is now discovered, for example, that disk P is corrupt and the administrator wishes to restore disk P from an existing disk such as disk S2, for example, then there is created and started a map 8, S2→P, which results in cascade S2→P (FIG. 4). Now using a separate cascade for the restore operation we would have three separate cascades. For instance if we restore P from S2 we would have cascades P→S3→S2→S1 and P→C3→C2→C1 (FIG. 3*d*) and S2→P (FIG. 4).

Before FlashCopy® S2→P is completed, the administrator may decide to continue making backups of disk P. Consequently, there is started a snapshot map 9, P→S4, a snapshot map 10, P→S5, a clone map 11, P→C4 and a clone map 12, P→C5, before S2→P is completed. As a result, there are cascades P→S5→S4 and P→C5→C4 (FIG. 5).

As previously mentioned, in order to keep track of cascaded storage volumes and FlashCopy® functions it is preferable to provide a data structure that defines primary and secondary "fdisks". However, the more times that a disk appears in a cascade the more IO operations may be required at the FlashCopy® level (cleaning IOs) before a host originated IO can be completed back to the host. For this reason the number of fdisks for each disk is typically limited (for example to 2).

For example, copending application Ser. No. 13/125,276, filed Apr. 20, 2011 and entitled "FLASHCOPY HANDLING", describes a method for restoring a production volume from a FlashCopy target in a cascaded FlashCopy environment as found in the IBM SAN (Storage Area Network) Volume Controller. This implementation can keep the number of copy writes bounded as a function of the number of instances of the production volume required in the FlashCopy cascade. However, it is frequently desirable to bound the number of copy writes severely to ensure performance of the production volume is not significant impacted by the restoration process. Therefore, it is typical to restrict the number of restorations that may be active at any one time to only two instances of the production volume (or one restoration process).

In the example of FIGS. 3*d* and 5, the disk P appears twice in the cascades and would be represented by two fdisks. Thus, if the administrator is limited to two fdisks for a particular volume, another fdisk for the volume P would not be added until either P→S3, P→S2 and P→S1 stop or complete, or S2→P stops or S2→P and P→S5 and P→S4 stop or complete. If disk P were to again become corrupted, the administrator would be unable to restore disk P again until one of these were to happen. Accordingly, if the backups are to be retained, the administrator would be unable to restore disk P without losing incomplete backups. As a result, absent cleaning operations in accordance with the present description as described below, the user or customer may need to wait until the first restore completes. Conversely, absent cleaning operations in accordance with the present description as described below, stopping the restore operation in progress may result in loss of the backups started after the recovery point was initiated. Consequently, absent cleaning operations in accordance with the present description as described below, a production system may be down an undesirable length of time.

One approach in such a situation is to provide a restriction in which it is only permitted to write to the original source disk P. If so, then when S2→P completes it is possible to naturally return the cascade configurations to P→S5→S4→S3→S2→S1, and P→C5→C4→C3→C2→C1, because the cleaning required for writes to P mean that S3 and C3 are each independent of any grains changed since S2→P was started as described above. However, this read-only target restriction typically can prevent a user from creating FlashCopy® maps for development or test purposes since those maps may require their target to be writable.

Another approach is described in copending application Ser. No. 13/039,108, filed Mar. 2, 2011 and entitled "MULTIPLE BACKUP PROCESSES" and assigned to the assignee of the present application. This approach includes a method of cascade cleaning that can be used to enable the system to return to a "steady state" once the restore has completed. More specifically, the method uses an additional cleaning process to ensure that when the restore completes, the newly taken backups can be inserted in the original cascade after the production volume. In this manner, the restriction against writes to volumes other than the production volume P may be reduced or eliminated. In addition combining cascades can facilitate adding an fdisk while staying within the imposed limit on the number of fdisks for a volume.

In this example, after the restore operation from the backup S2 and the subsequent backups of disk P, there are the cascades S2→P and P→S5→S4, and P→C5→C4, as shown in FIG. 5. In accordance with copending application Ser. No. 13/039,108, filed Mar. 2, 2011 and entitled "MULTIPLE BACKUP PROCESSES", the storage controller 8 may be operated to clean the data on the secondary copy of disk P for any write to disk S4, where disk S4 is the disk furthest downstream of a primary that has a secondary in another cascade. Thus, in addition to the usual cleaning operation on the secondary copy of disk P for a write to the primary disk P, the storage controller 8 will also clean the data on the secondary copy of disk P for any write to disk S4.

There will usually be no need to clean secondary disk P (FIG. 5) for writes to disk S5 because these writes will in accordance with the FlashCopy process, "split the data" that is, cause a cleaning write from disk P onto disk S4, to eliminate the dependency of S4 on S5 for that grain of data being overwritten on S5. Once restore operation S2→P completes, the controller 8 can now combine the two snapshot cascades to P→S5→S4→S3→S2→S1, because the writes to disk S4 have caused "split writes" from P to S3, just as if the cascade had originally been constructed in that way. There may be little or no additional overhead to this solution since the extra clean for a write to disk S4 can be the same or similar to a split read and write that would occur if the disk was not at the end of a cascade.

The present application describes another method of disk management which facilitates overcoming a restriction against writes to volumes other than the production volume P, and thereby facilitates combining cascades to allow adding an fdisk and yet remain within the imposed limit on fdisks. In one aspect of the present description, backup management operations in accordance with one embodiment of the present description, include cleaning operations from the source volume of the restoring operation (that is, the recovery point). These cleaning operations can permit the restoration to be stopped at any point without waiting for the restore or other copy operations to complete or stop and without sacrificing some or all existing backups. Instead, backups of the production volume started after the restore is initiated, can be retained after the restore is stopped, by slipping them into an existing cascade after the source volume of the restore. Furthermore, because the clone and snapshot backups are separated into different cascades in a manner similar to that described in copending application Ser. No. 13/069,293, filed Mar. 22, 2001 and entitled "MULTIPLE CASCADED BACKUP PROCESS", little or no cleaning may be required as a result of the stop of the restore operation.

Thus, a need to wait for the restore to complete in order to save the backups may be eliminated in many applications. Consequently a new restore operation may be quickly started following termination of a prior restore operation. Other aspects may be realized, depending upon the particular application.

Figure 6A:
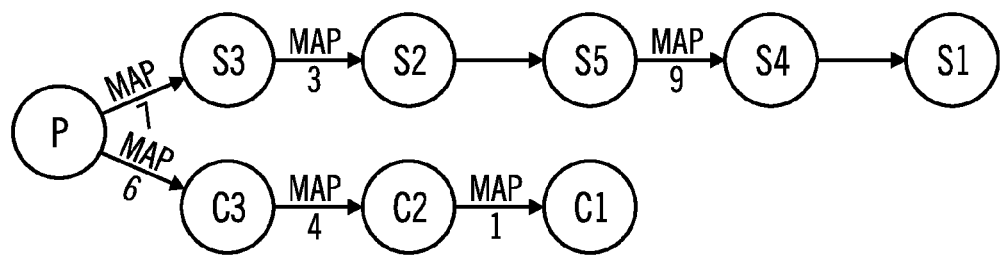
FIG. 6a is schematic diagram of a FlashCopy® cascade combined from separate FlashCopy® cascades after a restore operation has been stopped.
Figure 6B:
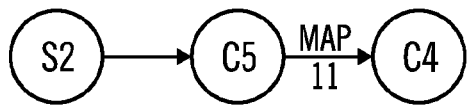
FIG. 6b is schematic diagram of another FlashCopy® cascade after a restore operation has been stopped.

As previously mentioned, in the example of FIG. 5, after the restore from S2 is initiated and the subsequent backups S4, S5, C4, C5 of disk P are initiated, there are the cascades S2→P and P→S5→S4 and P→C5→C4. As an alternative to copending application Ser. No. 13/039,108, filed Mar. 2, 2011 and entitled "MULTIPLE BACKUP PROCESSES", and in accordance with the present description, for any host write to the oldest snapshot volume following the initiation of the restore operation from a snapshot volume such as snapshot volume S2, for example, to the production volume P, the storage controller 8 may be operated to clean the data from the volume S2 (the snapshot volume from which the production volume P is being restored) to the volume S1 (the oldest snapshot volume in the snapshot cascade). This means that the grains of data S1 are either the same as S4 or are independent of any other volume. The consequence of this is that the restore operation S2→P can be stopped at any time and the cascades readily combined by inserting the new snapshot backups S5, S4 after the restore volume S2 in the cascade of snapshots of FIG. 3d. In this example, we end up with cascades P→S3→S2→S5→S4→S1 and P→C3→C2→C1 (FIG. 6a). In addition, the cascade S2→P→C5→C4 of FIG. 5 becomes the cascade S2→C5→C4 (FIG. 6b), since the restore operation S2→P stops.

In this manner, the backups S5, S4, C5, C4 initiated after the restore operation began are not lost as a result of the stop to the restore operation S2→P. Furthermore, a new restore operation may be started without waiting for the restore operation S2→P to complete. As a result, the customer or user can create many recovery points of the production data and restore it at any point without losing any recovery points, in many applications. Furthermore, the copy writes are still bounded by the number of instances of the production volume required in the FlashCopy cascade but there is little or no incentive to have more than 2 instances at any time because the restore process can be instantly refreshed or changed to a new recovery point without loss of existing recovery points.

Figure 7A:
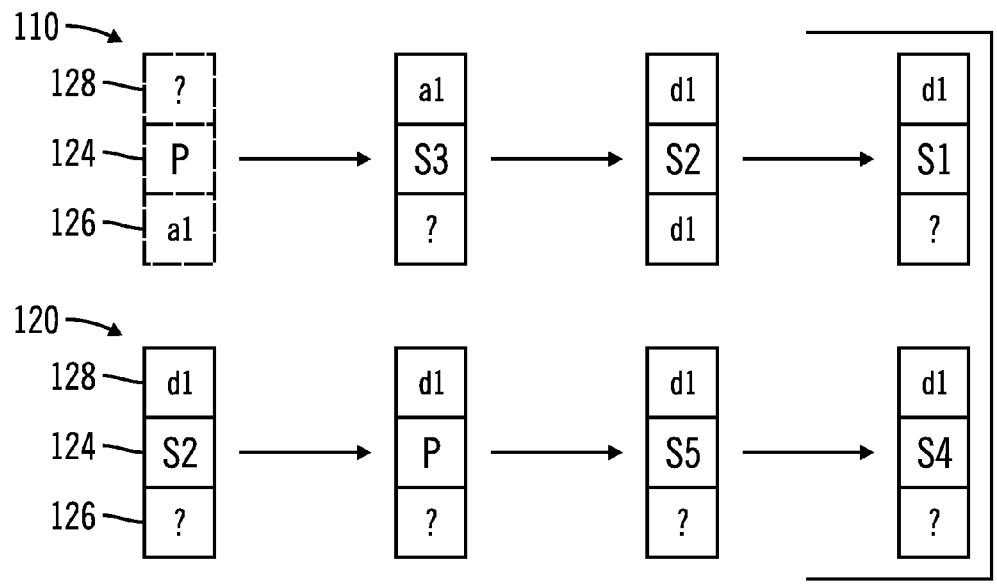
FIGS. 7a and 7b are schematic diagrams illustrating data writes.
Figure 7B:
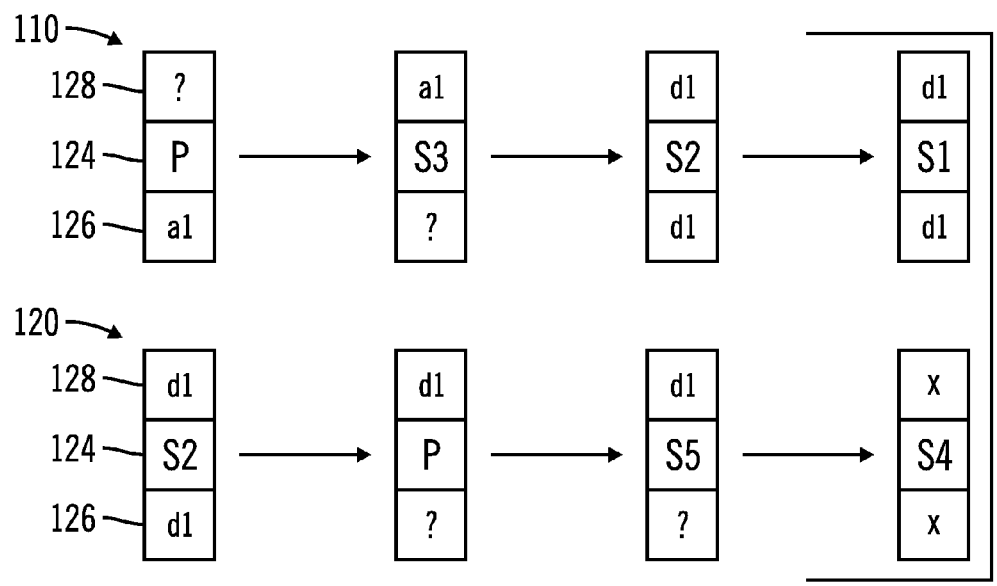

FIGS. 7a, 7b show the concept of the handling of the write with respect to a single grain of data within the different storage volumes. FIG. 7a shows two cascades 110, 120 prior to any write taking place. Each grain of data is represented by three blocks, the middle block 124 being a storage volume identifier 124. The lower block 126 represents the actual data being stored by the specific grain of data in the volume and the upper block 128 represents the location of data to be presented in the event of a read of the specific grain of data.

In the bottom row cascade 120 of FIG. 7a, which represents the restore cascade S2→P→S5→S4, the grains of data on storage volumes P, S5 and S4 have a "?" with respect to the specific grain of data. This means that the data d1 from the restore storage volume S2 has not yet been copied across to the production volume P or the backup disks S5 and S4. Since the FlashCopy® function is a copy-on-write function, when, for example, disk S4 is read, no data is copied to disk S4. The host read of disk S4 will be redirected to grain d1 on storage volume S2, to find the data to be read, according to the upper block 128.

The top row cascade 110 of FIG. 7a represents the cascade P→S3→S2→S1, where P is a secondary fdisk (indicated by the dotted line). This is a data structure separate from the actual storage volume P that needs to be maintained to serve accesses to storage volumes S3, S2 and S1. Note that the upper box 128 of the secondary representation of disk P has a "?", this is because the data returned for this grain does not logically exist because it is not the primary image. Any data read of disk P is handled with respect to the primary representation of the data, which is in the cascade 110 (bottom row) of FIG. 7a.

In the example of FIG. 7a, the grain of volume S1, the volume following the restoration source volume S2, in the top row cascade 110, cascade P→S3→S2→S1, depends upon the corresponding grain of restoration source volume S2. Similarly, the grain of S4, the oldest backup volume in the bottom row cascade 120, cascade S2→P→S5→S4, following initiation of the restore operation from restoration source volume S2, depends on the same volume grain, that is, the corresponding grain of restoration source volume S2. Hence, prior to a write operation to volume S4, the grain of volume S1 is the same as the grain of the volume S4.

FIG. 7b shows the grain configuration of FIG. 7a after a data write of X has been made to the specific grain of data of volume S4, the oldest backup volume in the bottom row cascade 120, cascade S2→P→S5→S4, following initiation of the restore operation from restoration source volume S2. This data write results in the new data "X" appearing on volume S4, and any read of S4 will be directed to "X". The read direction component 128 of the grain for volume S4 is also changed to "X" to reflect that any future data reads to the storage volume S4 will be read from the grain of the storage volume S4 rather than redirected to any other location.

In addition to the write of the data to volume S4, there is performed a cleaning data write on the restoration source volume S2 in the top cascade 110, cascade P→S3→S2→S1, of storage volumes, which cleaning data write corresponds to the received data write of volume S4, in grain terms. So from the restoration source volume S2 in the top row cascade 110, cascade P→S3→S2→S1, the grain "d1" is copied across to storage volume S1, the next storage volume in the top row cascade 110, cascade P→S3→S2→S1. This action is not needed under any FlashCopy® process that exists in either cascade; it is an extension of the backup processes to prepare for the merging of the cascades into a single cascade in the future. The data write onto the storage volume S4, the oldest backup volume in the bottom row restore cascade 120, cascade S2→P→S5→S4, following initiation of the restore operation from restoration source volume S2, results in the copy across from the restoration source volume S2 to the next volume S1 in that cascade.

Hence, prior to a write operation to volume S4 as shown in FIG. 7a, the grain of volume S1 is the same as the grain of the volume S4. However, following a write operation to volume S4 as shown in FIG. 7b, the grain of volume S1 is independent of other volumes due to the cleaning data write from the restoration source volume S2 to the next volume S1 in the top row cascade 110, cascade P→S3→S2→S1 of storage volumes, which cleaning data write corresponds to the received data write of volume S4, in grain terms. Consequently, as described above, the restore operation S2→P can be stopped at any time in many applications, and the cascades may be recombined as P→S3→S2→S5→S4→S1 and P→C3→C2→C1 (FIG. 6a), and cascade, S2→C5→C4 (FIG. 6b). without losing the backups S5, S4, C5, C4. Further, a new restore operation of the production volume P may be readily started.

Figure 8:
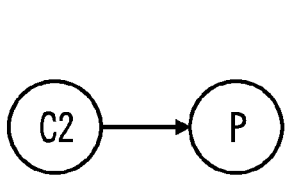
FIG. 8 is a schematic diagram of a restore operation from a clone backup volume in a FlashCopy® cascade.
Figure 9:
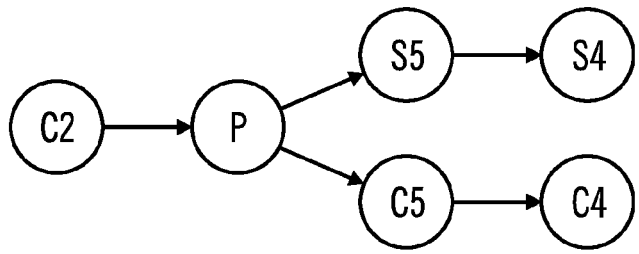
FIG. 9 is schematic diagram of a restore operation in separated snapshot and clone FlashCopy® cascades.

As another example, a restore may be performed for production volume P from clone volume C2 (FIG. 3d) with backups similar to the example above in connection with a restore from the snapshot volume S2. Hence, after this restore from volume C2 is initiated there is the cascade C2→P (FIG. 8). After subsequent snapshot and clone backups S4, S5, C4, C5 of disk P are initiated, there are the cascades C2→P and P→S5→S4 and P→C5→C4, as shown in FIG. 9.

Figure 10A:
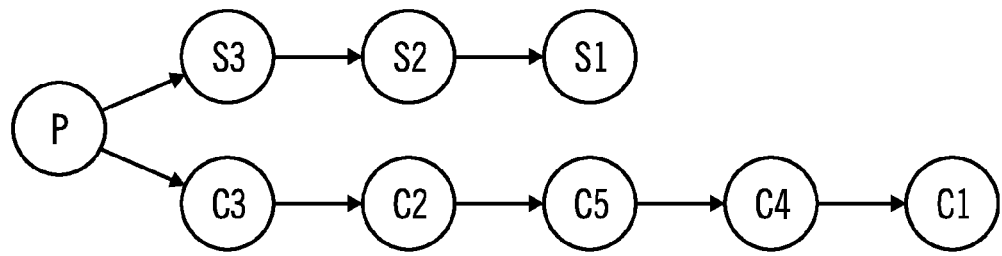
FIG. 10a is schematic diagram of a FlashCopy® cascade combined from separate FlashCopy® cascades after a restore operation has been stopped.
Figure 10B:
FIG. 10b is schematic diagram of another FlashCopy® cascade after a restore operation has been stopped.

In accordance with the present description, for any host or background write to the oldest clone volume following the initiation of the restore operation from a clone volume such as clone volume C2, for example, to the production volume P, the storage controller 8 may be operated to clean the data from the volume C2 (the clone volume from which the production volume P is being restored) to the volume C1 (the oldest clone volume in the clone cascade) as shown in FIG. 3d. This means that the grains of data C1 (FIG. 3d) are either the same as C4 (FIG. 9) or are independent of any other volume. The consequence of this is that at any time restore operation C2→P can be stopped and the cascades recombined as P→S3→S2→S1 and P→C3→C2→C5→C4→C1 as shown in FIG. 10a, and the cascade C2→S5→S4 as shown in FIG. 10b.

It is seen from the above that the customer or user can now create many recovery points of the production data and restore it at any point without losing any recovery points. The copy writes are still bounded by the number of instances of the production volume required in the FlashCopy cascade but there is no reason to have more than 2 instances at any time because the restore process can be instantly refreshed or changed to a new recovery point without loss of "any" existing recovery points.

Figure 11:
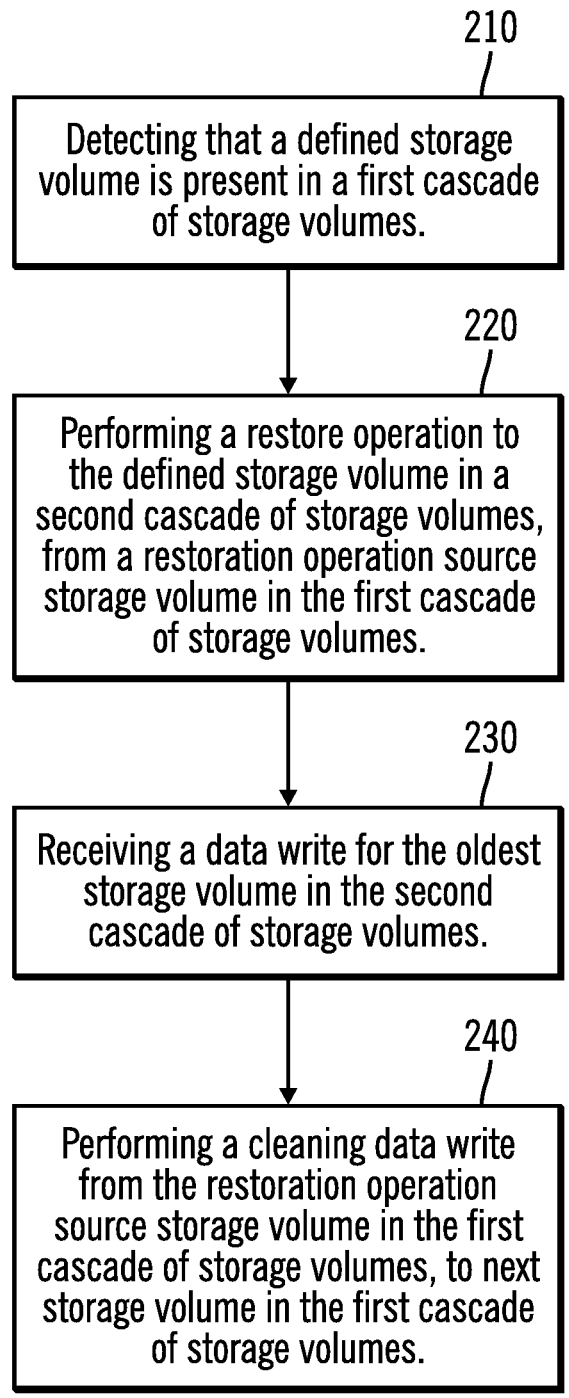
FIG. 11 is a flowchart of operations managing backup and restore processes.

FIG. 11 shows a flowchart summarizing the operation of the storage volume controller 8 in accordance with one embodiment of the present description. The method of handling multiple backup processes, which is performed by the controller 8 comprises detecting (block 210) that a defined storage volume is present in a first cascade of storage volumes. The top row cascade 110 of FIG. 7a provides an example of such a first cascade in which the production volume P is the defined storage volume. As discussed above, a cascade of storage volume comprises a plurality of storage volumes connected by a plurality of FlashCopy® functions, each FlashCopy® function creating a map from a source volume to a target volume. The cascade of storage disks can be user created or may have been created in response to one or more automated administrative functions of the storage system.

In another operation, the controller 8 performs (block 220) a restore operation to the defined storage volume which is also present in a second cascade of storage volumes, from a restoration operation source storage volume in the first cascade of storage volumes. The bottom row cascade 120 of FIG. 7a provides an example of such a second cascade in which the production volume P is the defined storage volume. In this example, the snapshot storage volume S2 is the restore operation source storage volume. The defined storage volume P is represented by a primary fdisk in the second cascade 120 of storage volumes and is represented by a secondary fdisk in the first cascade 110 of storage volumes. The controller 8 has access to the various data structures and metadata that exists in relation to the storage by the different storage volumes and is able to track the presence of a storage volume in multiple cascades. The fdisks can preferably used for this purpose, as the existence of a primary and secondary fdisk for a storage volume indicates that the specific storage disk is present in two different cascades.

In another operation, the controller 8 receives (block 230) a data write for the oldest storage volume in the second cascade of storage volumes. In the example of FIG. 7a, the oldest storage volume in the second cascade of storage volumes is the snapshot storage volume S4 which receives a data write as shown in FIG. 7b.

In yet another operation (block 240), a cleaning data write is performed from the restoration operation source storage volume in the first cascade of storage volumes to the next storage volume in the first cascade of storage volumes. In the example of FIG. 7b, a cleaning data write is performed from the restoration operation source storage volume S2 in the first cascade 110 of storage volumes to next storage volume S1 in the first cascade 110 of storage volumes as shown in FIG. 7b.

As discussed above, the normal working of the Flash-Copy® function in a multiple cascade scenario is extended to provide the cleaning of data in the first cascade, in order to better prepare for future handling of the multiple cascades. The method of operation by the controller 8 can be further extended by detecting that a specific FlashCopy® function has completed or terminated and combining the first cascade of storage volumes and the second cascade of storage volumes into a single cascade of storage volumes in response. In the example of FIGS. 7a, 7b, the first cascade 110 and the second cascade 120 are combined to form the cascade P→S3→S2→S5→S4→S1 of the cascade of FIG. 6a, as discussed above.

Other aspects may be utilized, depending upon the particular application.

Cloud Computing Embodiments

The computing environment of FIG. 1 may be part of a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The cloud computing implementation is described with respect to FIGS. 12-14. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick source platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various source devices through a thin source interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
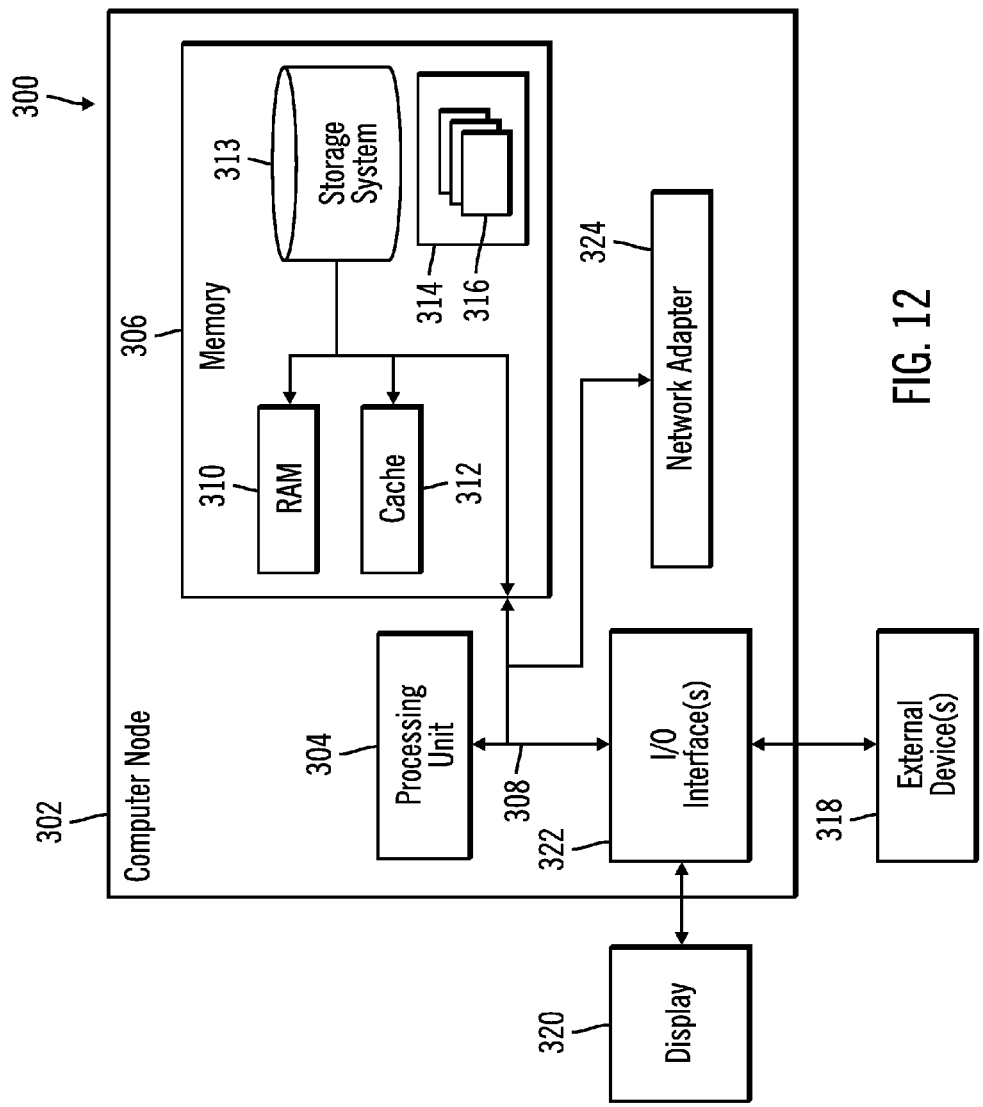
FIG. 12 illustrates an implementation of a node in a network computing embodiment.

FIG. 12 illustrates an embodiment of a cloud computing node 300 which may comprise an implementation of the source, target, and backup management components, where the components may be implemented in one or more of the nodes 300. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

In cloud computing node 300 there is a computer system/server 302, which is operational with numerous other general purpose or special purpose computing system environments or configurations. Examples of well-known computing systems, environments, and/or configurations that may be suitable for use with computer system/server 302 include, but are not limited to, personal computer systems, server computer systems, thin sources, thick sources, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 302 in cloud computing node 300 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein.

Computer system/server 302 may also communicate with one or more external devices 318 such as a keyboard, a pointing device, a display 320, etc.; one or more devices that enable a user to interact with computer system/server 302; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

Figure 13:
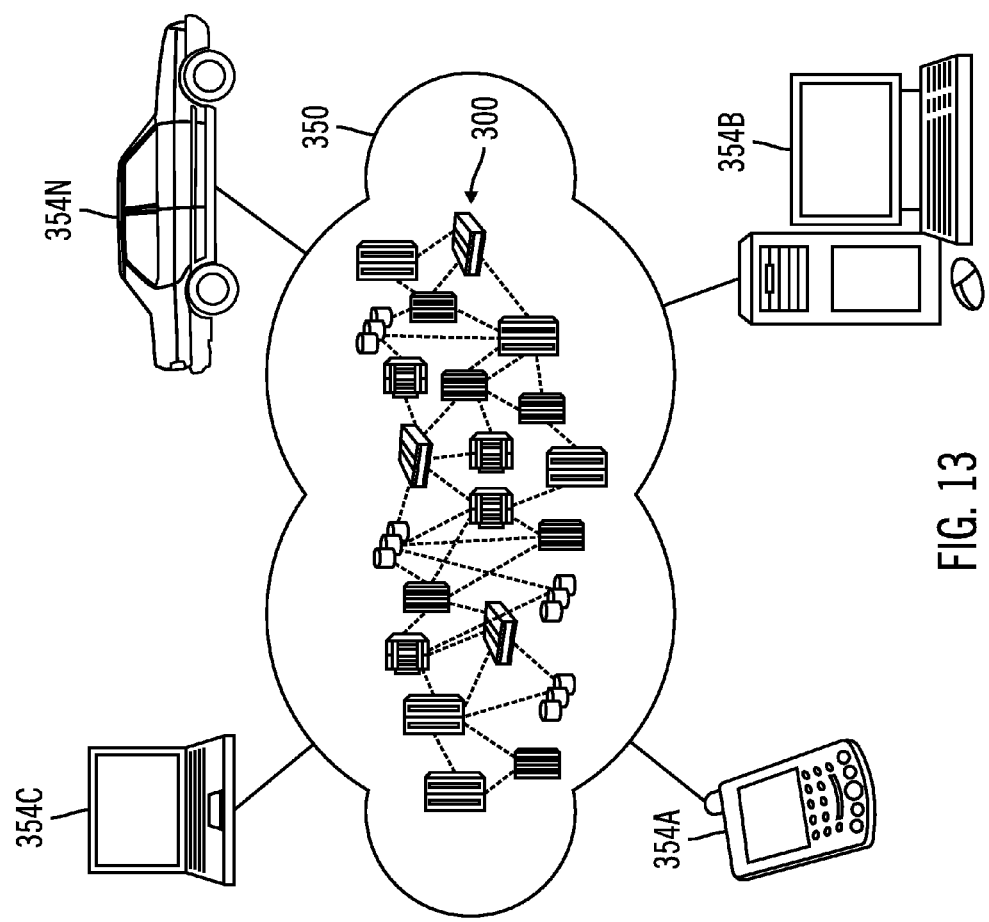
FIG. 13 illustrates an embodiment of a cloud computing environment.

Referring now to FIG. 13, illustrative cloud computing environment 350 is depicted. As shown, cloud computing environment 350 comprises one or more cloud computing nodes 300 with which local computing devices used by cloud consumers, such as, for example, personal digital assistant (PDA) or cellular telephone 354A, desktop computer 354B, laptop computer 354C, and/or automobile computer system 354N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 13 are intended to be illustrative only and that computing nodes 300 and cloud computing environment 350 can communicate with any type of computerized device over any type of network and/or network addressable connection (e.g., using a web browser).

Further, FIG. 13 shows a single cloud. However, certain cloud embodiments may provide a deployment model including a separate "Backup" or "Data Protection" cloud, in addition to the cloud having the customer/production data. Providing a separate and distinct additional cloud as the data protection cloud in order to separate whatever primary cloud model (provide, community, hybrid, etc) from the data protection cloud prevents a single point of failure and provides a greater degree of protection of the customer data in the separate backup cloud.

Figure 14:
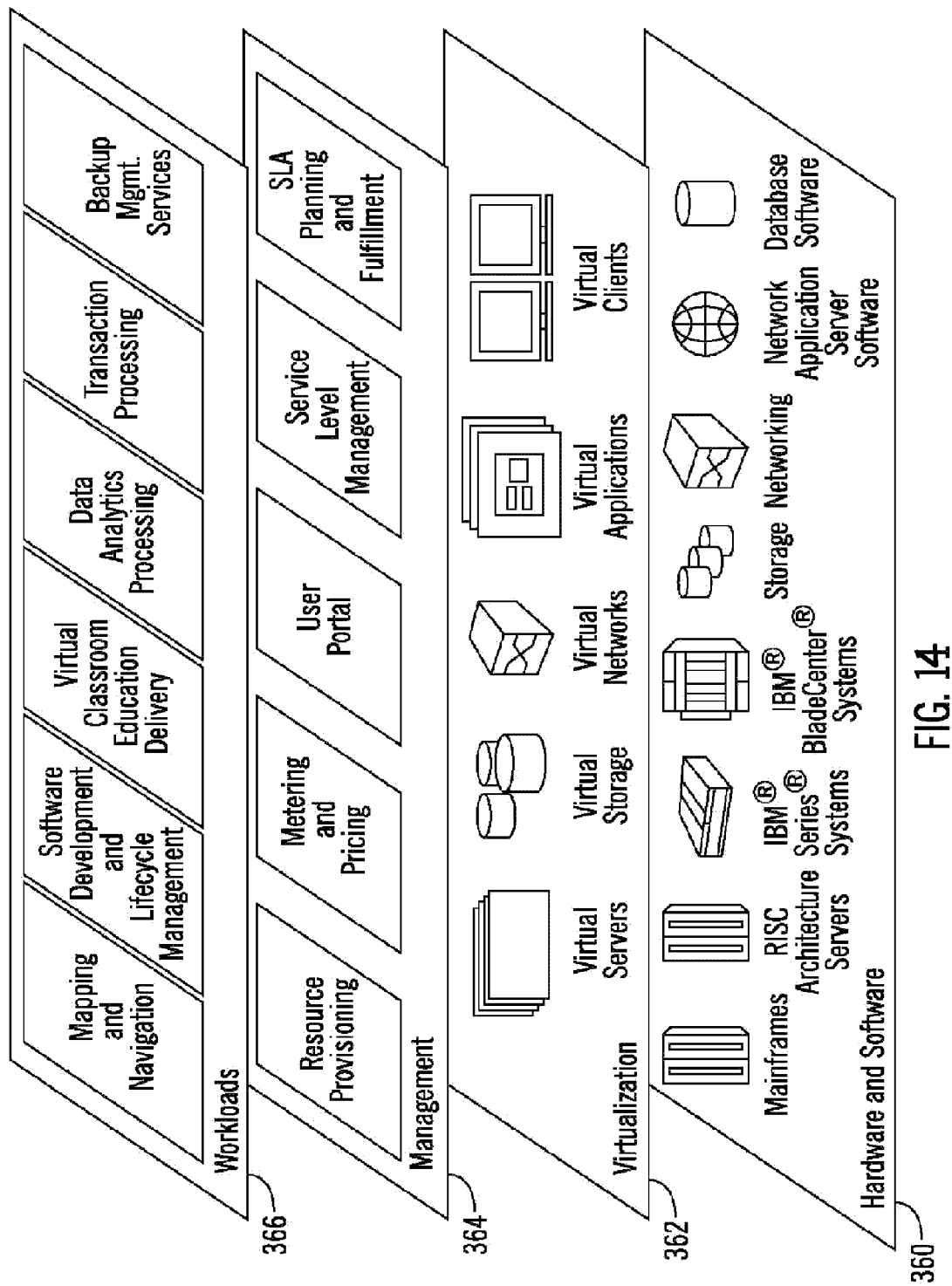
FIG. 14 illustrates an embodiment of abstraction model layers of a cloud computing environment.

Referring now to FIG. 14, a set of functional abstraction layers provided by cloud computing environment 350 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 362 provides an abstraction layer from which the following examples of virtual entities may be provided: virtual servers; virtual storage; virtual networks, including virtual private networks; virtual applications and operating systems; and virtual sources.

In one example, management layer 364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the backup management services, such as described with respect to FIGS. 1-11, above.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3a-11 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing multiple backup processes, the computer program product comprising a non-transitory computer readable storage medium having computer readable program code embodied therein that executes to cause a source server to perform operations, the operations comprising:
    detecting that a defined storage volume is present in a first cascade of storage volumes;
    performing a restore operation to the defined storage volume in a second cascade of storage volumes, from a restoration operation source storage volume in the first cascade of storage volumes;
    receiving a data write for an oldest storage volume in the second cascade of storage volumes; and
    performing a cleaning data write from the restoration operation source storage volume in the first cascade of storage volumes to a next storage volume in the first cascade of storage volumes, wherein the cleaning data write corresponds to the received data write and comprises copying data from the restoration operation source storage volume in the first cascade of storage volumes to the next downstream storage volume in the first cascade of storage volumes.

2. The computer program product according to claim 1, wherein a cascade of storage volumes comprises a plurality of backup storage volumes connected by a plurality of copy functions, wherein each of the copy functions creates a map from a source volume to a target volume.

3. The computer program product according to claim 2, wherein the operations further comprise:
    detecting that a specific copy function of the restore operation has been stopped; and
    combining the first cascade of storage volumes and at least a portion of the remaining second cascade of storage volumes into a single cascade of storage volumes.

4. The computer program product of claim 3 wherein the remaining second cascade of storage volumes is inserted into the first cascade of storage volumes between the restoration operation source storage volume in the first cascade of storage volumes and a next downstream storage volume in the first cascade of storage volumes.

5. The computer program product according to claim 2, wherein the backup volumes of the first and second cascades are limited to snapshot volumes.

6. The computer program product according to claim 2, wherein the backup volumes of the first and second cascades are limited to clone volumes.

7. The computer program product according to claim 1, wherein the defined storage volume is represented by a primary fdisk in the second cascade of storage volumes and represented by a secondary fdisk in the first cascade of storage volumes.

8. A system for managing multiple backup processes in a plurality of cascades of storage volumes, comprising:
    a processor; and
    a computer readable storage medium having code executed by the processor to perform operations, the operations comprising:
        detecting that a defined storage volume is present in a first cascade of storage volumes;
        performing a restore operation to the defined storage volume in a second cascade of storage volumes, from a restoration operation source storage volume in the first cascade of storage volumes;
        receiving a data write for an oldest storage volume in the second cascade of storage volumes; and
        performing a cleaning data write from the restoration operation source storage volume in the first cascade of storage volumes to a next storage volume in the first cascade of storage volumes, wherein the cleaning data write corresponds to the received data write and comprises copying data from the restoration operation source storage volume in the first cascade of storage volumes to the next downstream storage volume in the first cascade of storage volumes.

9. The system according to claim 8, wherein a cascade of storage volumes comprises a plurality of backup storage volumes connected by a plurality of copy functions, wherein each of the copy functions creates a map from a source volume to a target volume.

10. The system according to claim 9, wherein the operations further comprise:
    detecting that a specific copy function of the restore operation has been stopped; and
    combining the first cascade of storage volumes and at least a portion of the remaining second cascade of storage volumes into a single cascade of storage volumes.

11. The system of claim 10 wherein the remaining second cascade of storage volumes is inserted into the first cascade of storage volumes between the restoration operation source storage volume in the first cascade of storage volumes and a next downstream storage volume in the first cascade of storage volumes.

12. The system according to claim 9, wherein the backup volumes of the first and second cascades are limited to snapshot volumes.

13. The system according to claim 9, wherein the backup volumes of the first and second cascades are limited to clone volumes.

14. The system according to claim 8, wherein the defined storage volume is represented by a primary fdisk in the second cascade of storage volumes and represented by a secondary fdisk in the first cascade of storage volumes.

* * * * *